June 1, 1965 P. J. MURRAY 3,186,939
METHOD OF AND SYSTEM FOR SEWAGE TREATMENT
Filed Oct. 10, 1960
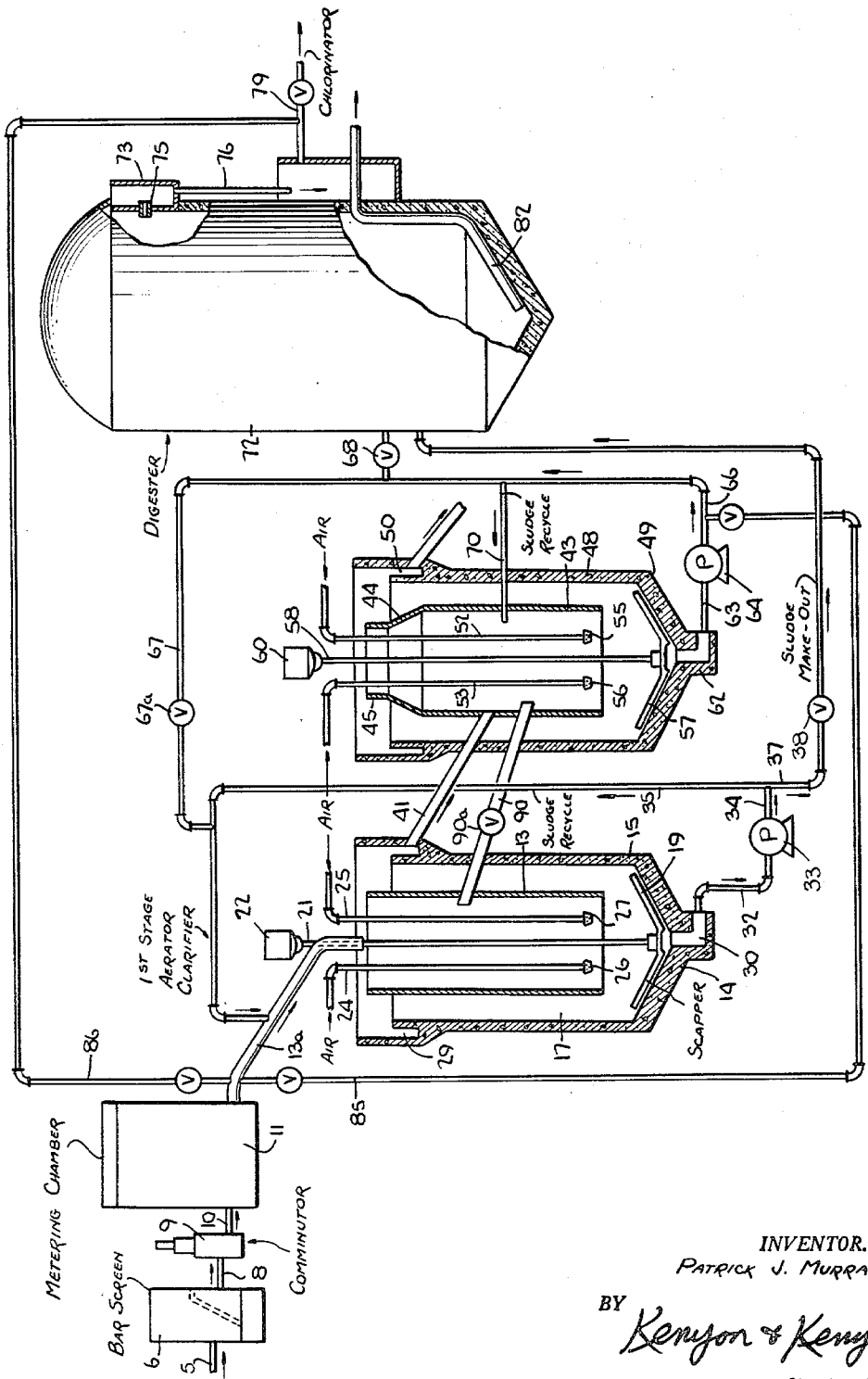
INVENTOR.
PATRICK J. MURRAY
BY Kenyon & Kenyon
ATTORNEYS

United States Patent Office 3,186,939
Patented June 1, 1965

3,186,939
METHOD OF AND SYSTEM FOR SEWAGE TREATMENT
Patrick J. Murray, Clark's Summit, Pa., assignor to Halmur, Inc., Allentown, Pa., a corporation of Pennsylvania
Filed Oct. 10, 1960, Ser. No. 61,778
14 Claims. (Cl. 210—7)

This application is a continuation-in-part application of my copending application Serial No. 858,631 filed December 10, 1959, now abandoned.

This invention relates to an improved method of treating waste liquors and, more particularly, it pertains to the treatment of sewage containing unusually high concentrations of organic matter.

In the treatment of sewage by conventional activated sludge techniques, utmost care must be taken to avoid having the sludge become inactive, because it takes long periods of time to restore its activity. The activated sludge carries the aerobic microorganisms, which, in conjunction with oxygen, convert organic matter to harmless materials such as carbon dioxide, water, etc. The bacteria are sensitive to acidity or pH in the treating medium, and cannot be kept away from oxygen for long periods of time, otherwise the sludge becomes septic, i.e. the aerobic bacteria die and anaerobic bacteria take over. Surges in sewage loads can also exert an unfavorable influence on the activated sludge. For these and other reasons, activated sludge plants have not been used as extensively as might be desired. The present invention is concerned with methods and apparatus whereby many of the disadvantages of prior techniques are overcome.

Thus, an object of this invention is to provide an improved method of treating sewage utilizing activated sludge.

Another object is to provide a system by which greater latitude in operating conditions can be tolerated in using activated sludge.

Still another object of this invention is to provide sewage treatment methods and apparatus which are highly efficient in removal of organic material but which may be economically installed and operated.

Other objects and advantages will become apparent from the following description.

In accordance with this invention, total sewage, without separation of solid organic matter, as is customary in conventional activated sludge processes, is combined with recirculated activated sludge and both are fed into an aeration zone into which air containing oxygen is introduced, all under conditions promoting uniform mixing. The treated sewage liquor is separated from the sludge and discarded or further treated, and substantially all of the sludge is separated from the treating medium and recycled for further use. The system may generally be described as involving the continuous recirculation of substantially all of the activated sludge followed by intermittent discharge of part of the sludge.

One of the significant features of the present invention is the passage of total sewage to the aeration zone. Heretofore raw sewage was first treated for the removal of solids which would readily settle, and the settled solids were passed to a digester where anaerobic fermentation or digestion took place. In the present case, the total raw sewage is subjected to treatment for subdivision of solids and the resultant mass is purified. It is found that the activated sludge produced from processing total raw sewage contains aerobic bacteria of a more robust nature than those that are synthesized in conventional systems.

I have also found that in order to obtain a very active sludge and optimum treatment in the aeration chamber, it is necessary that the raw sewage and recirculated activated sludge be uniformly and thoroughly dispersed and distributed throughout the aeration chamber. Preferably, I have accomplished this by feeding my recirculated activated sludge directly into the line carrying the raw sewage to the aeration chamber and then introducing the raw sewage and activated sludge at the top of the aeration chamber and as close to the center thereof as practicable. In this way I achieve uniform dispersion and approach optimum treatment by reason of having the raw sewage in contact with the activated sludge as intimately and for as long a period of time in the presence of oxygen as possible. As the distance between feed points of raw sewage and activated sludge increases, the tendency for non-uniform distribution thereof in the aeration zone likewise increases.

Sometimes, where the sewage contains an extremely high amount of solid organic material, it is desirable to increase the contact time between the oxygen and the sewage. One way I may accomplish this is by diffusing air through the recirculated sludge line along with the recirculated sludge.

The high nutrient content of the raw sewage makes possible a concentration of bacteria in the aeration zone more than 50% greater than the bacteria concentration in the aeration zones of conventional activated sludge systems. Such a highly activated sludge, which is obtained and then reused by recirculation, accelerates the rate of reaction with consequent reduction in the detention time and in the cost of equipment. One of the distinct advantages of my process is that a proper floc can be maintained at outside temperatures below —30° F. This is especially important in areas having colder climates where it is necessary to house the plants and perhaps even heat them, all of which increases cost. Furthermore, since my plant is only about one-sixth of the size of a conventional sewage treatment plant, if it is necessary to house it and heat it in extremely cold climates, the cost would only about one-sixth of that of a conventional system.

It has also been found that in my process an activated sludge of sufficient quantity and activity can be created within 10 to 12 hours, whereas in conventional methods it requires at least 4 to 6 weeks to accomplish the same results. Surges in plant loads can also be tolerated much better in my process than in conventional plants.

In carrying out my process, subdivision of the solids in the sewage is done by conventional equipment. A comminutor of standard design, such as the use of a rotor blade for breaking up the solids, has been used successfully. It is desirable to remove from the sewage any materials which may cause damage to the comminutor, and so a bar screen or the like is used ahead of the comminutor. A grit chamber may also be placed in the system if so desired. The degree of subdivision is best regulated by the settling rate of the resultant subdivided solid. Ideally, the smaller the particles of sewage the better, but for economical reasons, the criterion is to obtain subdivided solids which can be dispersed readily throughout the aeration chamber.

After the total sewage has been treated for reduction in size of solids, it is displaced to an aeration chamber. The point of entry therein is determined by consideration of obtaining uniform distribution in the chamber, and it is preferably located at the top of the aeration chamber. The sewage is contacted with air in the aeration zone or chamber. The air is fed into the chamber by means of distributors which jet it at linear velocities, for example, about ½ to 2 feet per second. By jetting the air, turbulence is created which facilitates uniform distribution of the reactants in the chamber. The air is fed at the central part of the aeration chamber for upward flow, and the raw sewage passes into and through the turbulent region of the upflowing air.

I have found that it is extremely important to place the air diffuser within the aeration chamber and near the bottom thereof, in order to obtain proper diffusion of the air through the sewage. I have found that preferably the distributors should be located about 6 inches above the bottom of the aeration chamber for optimum efficiency. Placement of the distributors at a point 12″ above or 12″ below this point may be required to meet design conditions. Furthermore, I have found that if the distributor or diffuser is covered with a cap which is forced upwardly by air pressure to permit air to escape from under the cap, the air holes in the distributor will be protected from clogging by the sludge. When the air pressure is turned off, the weight of the sludge will force the cap down on to the distributor, thereby closing the air holes.

The aeration chamber has an $L/D$ ratio (the ratio of the length to the diameter) such that the aerator is of sufficient volume to retain the total sewage flow for about 1.25 hours. The quantity of air used in my process will vary depending upon the character and organic concentration of the sewage and not only on the volume of sewage. Generally, I have found that in a two-stage process the amount of air in the first stage will vary from about 400 cubic feet to 600 cubic feet per pound of B.O.D. supplied to the primary unit and preferably about 500 cubic feet of air per pound of B.O.D. supplied to the unit. In the second stage the amount of air will generally vary from about 400 cubic feet to 600 cubic feet per pound of B.O.D. supplied also and preferably about 500 cubic feet per pound of B.O.D. The values may be adjusted to meet actual design conditions. In a one-stage process I have found that the amount of air may vary from about 500 cubic feet to 750 cubic feet per pound of B.O.D. but preferably should be about 650 cubic feet per pound of B.O.D.

Activated sludge settles from the treated liquor and is withdrawn for further recycle. The optimum rate of withdrawal of sludge would be the rate at which the sludge is settling; however, in practice, the settled sludge is withdrawn as completely and rapidly as possible consistent with maintaining a placid state in the clarifying zone. For certain operations, I also endeavor to maintain at the top of the aerator a solids concentration corresponding to 100 to 150 milliliters of settled sludge per liter of sewage when allowed to settle in a 1 liter graduated cylinder for 30 minutes, and in the bottom of the aeration chamber, about 75 to 125 milliliters of sludge per liter on the same basis. Settleable solids as measured above are equal to 1800 mg./L to 2700 mg./L, equivalent to a sludge index of 55, with a maximum sludge index of 70. The sludge age in the aeration chamber has an optimum range of approximately 0.3 to 0.6 day depending on frequency of withdrawal of settled sludge and concentration of solids in raw sewage. The settled activated sludge is regularly withdrawn and where a single aeration unit is used about 99%+ of the sludge is recirculated. When a number of aerator units, in series, are employed, as will be described in greater detail below, substantially all of the settled sludge is recirculated. In connection with the sludge concentrations mentioned above, I try to maintain a recycle rate of about 50 to 60 parts by volume of settled sludge, per volume of raw sewage feed. The rate of recirculation of activated sludge may be adjusted to maintain the proper amount of activated sludge in the aeration chamber. Actually, the recirculation rate for the first aerator is approximately twice that employed in conventional activated sludge plants and I believe that the rate of recirculation of the sludge has an important bearing on the successful operation of this process.

My new sewage treatment system may be characterized as one involving continuous recirculation of substantially all of the activated sludge followed by intermittent discharge or wasting of part of the sludge. This is to be contrasted with conventional activated sludge processes in which the settled sludge is detained for as much as 2½ to 3 hours before recirculation, this detention resulting in a weak and, at times, a septic sludge. A septic sludge is a sludge undergoing putrefaction in the absence of oxygen. Because of the continuous and rapid recirculation of the activated sludge, the age of the sludge is kept low, preferably about 0.4 day, and I believe that if the sludge is kept for a substantially greater period of time, about one day, the sludge will become septic and seriously impair the successful operation of the system.

Furthermore, in accordance with my process it is possible to recirculate the supernatant liquid from the digester to the raw sewage line for possible recirculation through the system. Of course, it is apparent that where supernatant liquid, which contains suspended solids, is returned to the system, both the suspended solids content and the B.O.D. of the sewage are going to be substantially higher than if raw sewage were treated alone. In fact, where the supernatant liquid is returned to the system, the B.O.D. of the mixture of the raw sewage and supernatant liquor is 80% higher than the raw sewage alone. The suspended solids of the mixture is 98% higher than in the raw sewage alone. Yet my system produces a satisfactory effluent in spite of these higher pollution loads.

In conventional processes, special provision is usually made for removing fats or oleaginous material which float at the surface of the sewage. In the present case, this is unnecessary because it creates an environment in which the oleaginous material is oxidized and/or emulsified in the final product and is thus eliminated. Further, in my process, no difficulties arise from the presence of detergents as is usually the case in activated sludge plants. At times of heavy detergent loads, the pH of the liquor in the aeration chambers goes to about 7.5 and yet no foaming occurs, and the aerobic bacteria are not adversely affected.

All of the factors hereinabove discussed, including the feeding of total raw sewage, recirculating substantially all of the activated sludge and the complete removal from the system of the sludge before it is aged to the point where it becomes septic, as well as uniform mixing and dispersion in the aeration chamber, make it possible to obtain the substantial results described. These factors and their interrelationship will be better understood by reference to the accompanying drawing which forms a part of this specification.

In the drawing I have shown a two-stage system in which total sewage (at the design rate of 140,000 gallons per day) is fed through line 5 into a bar screen 6 wherein all large objects such as sticks, etc. are removed. While the design total sewage was as indicated above, this system is satisfactory for handling surges far above this amount, and, in fact, will accept as much as about 250,000 gallons per day over a short period of time, and has accepted an average of 190,000 gallons per day over extended periods.

The sewage passes from bar screen 6 into a line 8, then into a grit chamber (not shown) and thence into a comminutor 9. In the comminutor 9 the large solids are broken up into particles of about 1/32 to 1/8 inch. The comminuted sewage passes from the comminutor 9 to a metering chamber 11 by means of an interconnecting line 10. The metering chamber measures the volumetric rate of the sewage feed.

The metered sewage is then passed directly into an aeration chamber of the first stage at about the center thereof by means of line 13a. It will later be appreciated that line 13a cannot feed into the aeration chamber at the exact center in the construction shown, since shaft 21 and motor 22 are there located. However, where said shaft and motor can be placed elsewhere, it would be preferable to feed the metered sewage directly into the center of the chamber 13. Chamber 13 is cylindrical and open at both ends. It has a diameter of about 12 feet and a depth or a height of about 11 feet 2 inches. Chamber 13 is disposed concentrically within tank 15, the bottom of said chamber being located in the apparatus shown about 2 feet from the sloping bottom 14 of tank 15. An annular zone or clarifying zone 17 is formed between the walls of chamber 13 and tank 15. Tank 15, as shown, has a diameter of about 20 feet. A scraper 19 rests on sloping bottom 14 of tank 15, said scraper being rotatable by means of a central vertical shaft 21 driven by motor 22. Alternatively, scraper 19 may be driven from the bottom rather than from vertical shaft 21. This will permit the introduction of air at the exact center of aerator shell 13 because there would be no drive shaft extending downward to scraper 19. Scraper 19 may have on the end thereof scraper arms, neoprene extensions, which will scrape the bottom wall and permit contraction of the scraper arms to compensate for wear. A settling zone is formed below the aeration chamber. Air is fed into the aeration chamber 13 by means of lines 24 and 25 and distributors 26 and 27 connected thereto, said distributors being positioned in and adjacent to the bottom of chamber 13. As indicated previously, the position of the distributors is quite important for proper operation of the system. The distributors should preferably be relatively large on the order of a capacity of about 120–130 cubic feet per minute.

Weir 29 is formed at the top of tank 15 to receive the overflow from clarifying zone 17. A sump or well 30 is located at the bottom of tank 15 to receive sludge deposited therein by scraper 19, said sludge being then withdrawn from sump 30 by means of line 32 and pump 33. The sludge is carried by line 34 into a T connection whereby all or a part thereof may be recycled through line 35, said line passing said sludge into line 13a at a point above the entry of said line into aeration chamber 13. Part or all of said sludge may be withdrawn from the system by means of line 37 which divides from line 34 and has a control valve 38 installed therein to control the amount of sludge being withdrawn to the digester 72.

The second stage shown in the drawing is of generally similar construction to the first stage, except for specific differences in the design of the aeration chamber 43, and except for specific differences in the recirculation of sludge. Structurally the top of aeration chamber 43 may be reduced in cross-sectional area by means of a frustoconical section 44 which is connected to a cylinder 45 of reduced diameter. As in the first stage, the second stage comprises an outer tank 48 having a sloping bottom 49 and a weir 50, air lines 52 and 53 feeding into air distributors 56 and 57, a scraper 57 mounted by one end of a central shaft 58 which is powered by motor 60. The position of the distributors is essential as indicated in connection with the first stage and the scraper 57 may be rotated from the bottom if desired. The sludge withdrawal system similarly comprises a sump 62, line 63, pump 64, line 66, control valve 68, and it may include a recirculation line 67 having valve 67a therein, which line is adapted to carry the recycled sludge back into the recirculation line 35 of the first stage. Return line 70 is connected to line 66, whereby by closing valves 67a and 68, sludge may be recycled directly into aeration chamber 43. Liquid overflowing into weir 50 can be passed by line 50a to a chlorinator (not shown).

The aeration chamber 43 can be of the same configuration as the aeration chamber 13 but some advantage is obtained in the design of chamber 13 in that the clarifying zone 84 between the inner and outer walls in the second stage is increased gradually at the top, thus insuring less carry-over of the solids in the outgoing liquor from weir 50.

The first and second stages are connected by lines 41 and 90. Line 41 connects weir 29 with aeration chamber 43 and passes the liquid flowing over into weir 29 directly into said second stage aeration chamber. Line 90 provides a direct gravity connection between the aeration chambers 13 and 43, valve 90a providing a means for opening and closing this connection. In this way a highly abundant active sludge in the aerator of the first stage can be passed into the aerator of the second stage for balancing the system if so desired. Alternatively, to increase the activated sludge in the second stage, total sewage from line 13a could be passed into aerator 43 by means of line 85 connecting with line 66 and thence into line 70.

It will be apparent that, although the liquor from weir 29 may be passed directly into aeration chamber 43 as shown, and although recycled sludge may be passed into aeration chamber 43 via line 70 as shown, and beneficial results can be obtained using this construction, especially in the second stage, it is preferred that this liquid and the recycled sludge be combined and passed directly into aeration chamber at a point near the top thereof.

Sludge withdrawn from tanks 15 and 48 which is not recirculated may be fed to a digester 72 by means of lines 37 and 66. In the digester 72, supernatant liquor flows into an overflow well 73 by means of opening 75; line 76 then carries said overflow liquor into a second well 78. The liquid passing into said well may be withdrawn therefrom by means of line 79 which may discharge the liquor either directly into a chlorinator (not shown) or into another line 86 by which this liquid may be recirculated back into the sewage system of line 13a.

The sludge settled at the bottom of digester 72 may be withdrawn therefrom by means of line 82 and passed to drying beds (not shown).

In the above description, I have attempted to picture and describe a complete two-stage system for sewage treatment. However, I have found that only one stage may be necessary to accomplish the degree of treatment desired. I have operated one stage of my process (by-passing the other stage) and have obtained very high degrees of treatment as evidenced by methylene blue test performed on 6–8 oz. bottles of effluent over a period of time. I have consistently obtained about 89% relative stability by these tests, using only a single stage, and I have found that I can achieve such removal within 3 or 4 days after initiating the operation of the plant.

It is apparent, that, when operating both stages, the bulk of the B.O.D. is removed by Unit No. 1. If efficiencies are based on the mixed raw sewage and supernatant liquor, the No. 1 unit efficiency would be about 92% and the total efficiency of both units would be over 97%. The second stage then serves to increase the B.O.D. removal above and beyond that obtained in the first stage so that a total plant capacity of over 94% may be obtained.

Furthermore, I have found that the first stage will remove over 75% of the suspended solids in the raw sewage and that the total removal of the suspended solids is about 86% when both the first and second stages are employed.

The efficiency of this plant is far beyond that obtainable by comparable processes and it compares very favorably with the efficiency of sewage treatment plants costing many times what this installation would cost. In fact, I would expect that one stage of my process would give treatment equivalent to virtually any sewage treatment process presently available commercially at only a fraction of the cost thereof.

In addition to the apparatus and methods shown and described, with the variations I have indicated, I have also found additional ways to practice my method of sewage treatment and to improve the operation thereof in certain respects. For example, an alternative method may be used for recirculating the sludge by means of an air lift placed in lines 35 or 66–67. By this means, air or oxygen-containing gas may be fed directly into these lines where they begin upward flow or at any point along that upward flow, under pressure. If desired, an eductor may be employed in the recirculation sludge line to facilitate recirculation. In fact, the flow of air or oxygen-containing gas may be such that part is used for air lifting the recirculated sludge and part is passed into the distributors 26, 27, 55, 56. Said distributors may also be of different design, e.g. in square or rectangular shapes with perforations along the peripheries thereof. Further, such a distributor may be supported on a central shaft which in turn is supported by the bottom of the outer tank 15 or 48 and extends for the entire length of the tank.

An improved and alternative method of passing air into the distributors 26, 27, 55, 56, or such distributors as may be used, would be to locate and air pump between the two stages at a point above the level of the air distributors so that the air could be fed directly through the walls of tanks 15 and 48 into the distributors. This construction would simplify the superstructure necessary for the installation of my sewage treatment apparatus.

Scrapers 19 and 57, each of which is mounted by the end of a shaft passing upwardly through the respective aeration chambers may also be peripherally powered for rotation about the same axis. In this manner, shafts 21 and 58, and motors 22 and 60 can be eliminated to thereby improve circulation in aeration tanks 13 and 43 and to permit central discharge of sewage and recirculated sludge into said aeration chambers.

I have hereinabove described a one-and two-stage sewage disposal method and apparatus, the individual stages of which may be operated similarly or differently, as described. This method is so efficient that, whereas in a conventional activated sludge process it may take weeks or months to obtain a sufficiently active sludge in sufficient quantity to achieve the desired treatment of sewage, I can obtain such a sludge within hours. Further, I can increase the treatment by utilizing a second stage, and pass activated sludge from the first into the second and vice versa, to thereby improve even further the degree of total treatment to be obtained. For example, I may place a pump in line 41 so that liquid may be pumped from the first to the second stage or vice versa. Furthermore, line 41 may be constructed such that the liquid is introduced into the top of chamber 43. Whether I use one or two stages, however, I endeavor to maintain continuous recirculation of substantially all of the activated sludge, and at least intermittent discharge of the remainder to a digester. Obviously, the discharge is somewhat dependent upon the type and size of unit employed, and where indicated, the discharged could be continuous. This principal of continuous recirculation of activated sludge, together with the charging of total raw sewage, is basically novel and provides advantages not obtained in any other similar system.

Although I have described the basic elements of my improved process and apparatus whereby this process may be employed, it is possible for the process to be utilized with specifically different apparatus, and I appreciate that certain modifications in my apparatus may be adopted without departing from the basic process. For example, although I prefer the continuous recirculation of substantially all of the activated sludge, it is my object to avoid prolonged detention of the sludge at the base of the aeration chamber, and to maintain a concentration of activity of the sludge in the aeration chamber itself. It is possible that this may be accomplished by intermittent recirculation sufficient to disrupt the detention of the sludge at the base of the aeration chamber, and at the same time, add sufficient activated sludge to the aeration chamber itself via introduction in the raw sewage line to maintain the degree of aerobic activity believed desirable. All of this would be fully within the scope of my invention and I desire that the scope thereof be measured only by the appended claims.

EXAMPLE

A plant having the capacities shown below and operated in accordance with the system as described above was operated over a period of several months with an average raw sewage flow of 191,212 gallons per day. The plant was constructed to handle an average daily flow of about 140,000 gallons per day. The maximum daily flow was 244,940 gallons and the minimum daily flow was 127,820 gallons per day. Included in this daily raw sewage were approximately 15,000 gallons per day of dairy waste, including waste from milk processing, whey from the manufacture of cottage cheese and waste from the manufacture of ice cream, creating a shock load on the plant during the morning hours. However, the plant handled this load satisfactorily even though this dairy waste approach 10% of plant design load.

The average operating conditions of the plant over the test period are set forth below:

Recirculation—Sludge:
    Unit No. 1 _____ 75 g.p.m., 105,500 g.p.d.
    Unit No. 2 _____ 25 g.p.m., 35,250 g.p.d.
Unit capacities:
    Aeration chamber—
        Unit No. 1 _____ 1,186 cu. ft.–8,900 gals.
        Unit No. 2 _____ 1,123 cu. ft.–8,430 gals.
    Settling chamber—
        Unit No. 1 _____ 2,584 cu. ft.–19,350 gals.
        Unit No. 2 _____ 2,660 cu. ft.–19,915 gals.
Detention time—average:
    Aeration Chamber—
        Unit No. 1 _____minutes__ [1]43
        Unit No. 2 _____do____ [2]53
    Settling chamber—
        Unit No. 1 _____hours__ 2.43
        Unit No. 2 _____do____ 2.52

[1] 0.56 to 1 recirculation rate—average flow for test period.
[2] 0.19 to 1 recirculation rate—average flow for test period.

Volume of air used:
    Unit No. 1 _____ 0.87 c.f./gal. raw sewage 560 c.f./lb. of B.O.D. applied.
    Unit No. 2 _____ 0.33 c.f./gal. raw sewage, 1500 c.f./lb. of B.O.D. applied.[1]

Duplicate blowers—one in use on each unit at a time. Second unit stand-by.

[1] It should be noted that far more air than was necessary was supplied to Unit No. 2 due to limitations in regulating the particular equipment used.

The recirculation of sludge in Unit No. 1 is approximately twice that of conventional sludge plants. Approximately 750 gallons of raw sludge were wasted to the digester for 30 minutes each morning. Supernatant liquid was recirculated to the total sewage line for a period of 1–2 hours each day at a rate of 300–600 gallons per hour. The raw sewage fed to the aerator had an average B.O.D. of 185 mg./l. and contained 169 mg./l. of suspended solids. The final effluent had an average B.O.D. of 13 mg./l. and contained 24 mg./l. of suspended solids. Thus, calculated only on the basis of raw sewage, there was a reduction of 88% in B.O.D. and 86% in suspended solids.

The raw sewage plus supernatant liquor being recirculated from the digester which was being fed to the aerator had an average B.O.D. of 298 mg./l. and contained an average suspended solids content of 337 mg./l. The final effluent of this feed from the No. 1 Unit had an average B.O.D. of 22 mg./l. a nd a solids content of 32 mg./l. thus giving an average B.O.D. removal of 94.9% and average suspended solids removal of 88.4% by the No. 1 Unit. The No. 2 Unit only increased plant efficiency 5.4%. Basing B.O.D. efficiencies on the mixed raw sewage and supernatant liquid, the No. 1 Unit had an efficiency of 92.1 and the total efficiency of Units 1 and 2 was 97.5%. The removal of suspended solids showed a primary efficiency of 75.6% with a total removal of 86%.

As previously mentioned, the process of this invention permits the handling of concentrations of sludge and suspended solids far in excess of that which can be handied in conventional activated sludge processes. This is illustrated most dramatically in Table I which records the results of a total oxidation test which was run in the plant described above. During the entire period of time of this test no sludge was withdrawn to the digester.

As far as I know my process is the only activated sludge process capable of treating raw sewage for five consecutive days without having to withdraw sludge from the aerating unit to the digester. This is not only most remarkable but is extremely important. Operating my process as Table I

|  | Thursday | | Friday | | Saturday | | Sunday | |
| --- | --- | --- | --- | --- | --- | --- | --- | --- |
|  | A.M. | P.M. | A.M. | P.M. | A.M. | P.M. | A.M. | P.M. |
| Raw Sewage B.O.D | 154.0 | | 152.0 | | 1,200 | | 81.0 | |
| S. Sol.[1] | | 192.0 | | 256.0 | | 190.0 | | 284.0 |
| #B.O.D. 1 Day | | | | | | | | |
| #S.S. 1 Day [2] | | | | | | | | |
| Unit No. I 30 Min. Set. Sol | 180 | 185 | 215 | 215 | 230 | 235 | 265 | 268 |
| P.P.M. S. Sol.[1] | 2,292 | 3,124 | 4,904 | 3,466 | 3,962 | 2,930 | 3,922 | 3,340 |
| D.O | 1.8 | 0.0 | 0.0 | 0.0 | 0.6 | 0.0 | 0.0 | 0.0 |
| Sludge Index | 78.5 | 59.2 | 43.8 | 62.0 | 58.0 | 80.2 | 67.5 | 80.2 |
| Sludge Age | 0.559 | 0.762 | 0.897 | 0.634 | 1.11 | 0.826 | | |
| Effluent No. I: | | | | | | | | |
| B.O.D | 27.6 | | 27.3 | | 15.4 | | 18.6 | |
| S. Solids [2] | | 47.0 | | 60.0 | | 43.0 | | 54.0 |
| D.O.[3] | 1.5 | | 3.2 | | 3.6 | | 5.2 | |
| Unit No. II 30 Min. Set. Sol | 30 | 30 | 30 | 30 | 32 | 35 | 40 | 40 |
| P.P.M. S. Sol.[1] | 424 | 436 | 1,708 | 378 | 1,142 | 928 | 1,276 | 752 |
| D.O | 9.0 | 7.6 | 9.4 | 8.4 | 8.0 | 7.4 | 9.2 | 8.6 |
| Sludge Index | 70.7 | 68.6 | 17.5 | 79.3 | 28.0 | 37.7 | 31.3 | 53.1 |
| Sludge Age | 0.399 | 0.409 | 1.26 | 0.279 | 1.34 | 1.09 | | |
| Plant Effluent: | | | | | | | | |
| B.O.D | 10.5 | (93.5%) | 22.7 | (86.0%) | 11.0 | (91.0%) | 9.7 | (88.1%) |
| S. Solids [2] | | 27.0 | | 48.0 | | 18.0 | | 41.0 |
| D.O.—Field | 9.0 | 7.6 | 9.4 | 8.4 | 8.0 | 7.4 | 9.2 | 8.6 |
| D.O.—Lab | | 9.1 | | 9.7 | | 9.5 | | 9.0 |
| Flow Rate: | | | | | | | | |
| Weir Reading Avg. Day Reading | 5.18 | | 5.18 | | 4.87 | | | |
| Gallons Per Minute | 132 | | 132 | | 115 | | | |
| Gallons Per Day | 190,080 | | 190,080 | | 165,600 | | | |
| Weir Record: | | | | | | | | |
| Temp | 39 | 40 | 36 | 38 | 29 | 42 | 23 | 36 |
| Blowers No. I | 1 | | 1 | | 1 | | 1 | |
| No. II | 1 | | 1 | | 1 | | 1 | |
| Percent Cap. of Operation (By Vol.) | 135% | | 135% | | 118% | | | |

|  | Monday | | Tuesday | | Wednesday | | Thursday | | Friday | |
| --- | --- | --- | --- | --- | --- | --- | --- | --- | --- | --- |
|  | A.M. | P.M. | A.M. | P.M. | A.M. | P.M. | A.M. | P.M. | A.M. | P.M. |
| Raw Sewage B.O.D | 140 | | 106 | | 120 | | 110 | | 105 | |
| S. Sol.[1] | | 218 | | 212 | | 302 | | 200 | 184 | |
| #B.O.D. 1 Day | | | | | | | | | | |
| #S.S. 1 Day [2] | | | | | | | | | | |
| Unit No. I 30 Min. Set. Sol | 275 | 275 | 240 | 290 | 285 | 275 | 260 | 210 | 280 | 225 |
| P.P.M. S. Sol.[1] | 3,722 | 3,304 | 4,076 | 3,570 | 3,992 | 3,372 | 3,186 | 2,912 | 3,640 | 2,942 |
| D.O | 0.4 | 0.0 | 0.4 | 0.0 | 0.0 | 0.0 | 0.0 | 0.0 | 0.1 | 0.0 |
| Sludge Index | 73.8 | 33.2 | 58.8 | 81.2 | 71.3 | 81.5 | 81.6 | 72.1 | 77.0 | 76.5 |
| Sludge Age | 0.810 | 0.718 | 0.912 | 0.795 | 0.323 | 0.273 | 0.755 | 0.390 | 0.938 | 0.758 |
| Effluent No. I: | | | | | | | | | | |
| B.O.D | 40.9 | | 24.3 | | 98 | | 62.4 | | 58.0 | |
| S. Solids [2] | | 70.0 | | 74.0 | | 188 | | 227 | | 251.0 |
| D.O.[3] | 2.1 | | 1.5 | | 1.0 | | 3.1 | | 1.0 | 2.0 |
| Unit No. II 30 Min. Set. Sol | 60 | 90 | 140 | 150 | 185 | 200 | 230 | 235 | 250 | 260 |
| P.P.M. S. Sol.[1] | 687 | 1,634 | 2,268 | 2,360 | 3,640 | 3,324 | 4,210 | 3,410 | 4,136 | 3,384 |
| D.O | 4.2 | 1.6 | 3.0 | 1.8 | 1.8 | 1.0 | 0.8 | 1.0 | 2.0 | 1.0 |
| Sludge Index | 88.4 | 55.0 | 61.7 | 63.8 | 70.0 | 60.1 | 54.6 | 68.9 | 60.4 | 76.8 |
| Sludge Age | .434 | 1.047 | 1.374 | 1.424 | 0.611 | 0.769 | .832 | .674 | 0.739 | 0.604 |
| Plant Effluent: | | | | | | | | | | |
| B.O.D | 25.4 | (81.8%) | 10.2 | (90.4%) | 10.8 | (91.0%) | 4.8 | (95.7%) | 6.1 | (94.1%) |
| S. Solids [2] | | 30.0 | | 51.0 | | 51.0 | | 51.0 | | 29.0 |
| D.O.—Field | 4.2 | 1.6 | 3.0 | 1.8 | 1.8 | 1.0 | 0.8 | 1.0 | 9.0 | 6.8 |
| D.O.—Lab | | 9.3 | | 9.2 | | 9.2 | | 8.9 | | 8.1 |
| Flow Rate: | | | | | | | | | | |
| Weir Reading Avg. Day Reading | 5.12 | | 5.11 | | 5.19 | | 5.11 | | 5.08 | |
| Gallons Per Minute | 130 | | 130 | | 134 | | 130 | | 130 | |
| Gallons Per Day | 187,200 | | 187,200 | | 192,960 | | 187,200 | | 187,200 | |
| Weir Record: | | | | | | | | | | |
| Temp | 30 | 34 | 19 | 20 | 15 | 31 | 23 | 40 | 26 | 44 |
| Blowers No. I | 1 | | 1 | | 1 | | 1 | 2 | 2 | 2 |
| No. II | 1 | | 1 | | 1 | | 1 | 1 | 1 | 1 |
| Percent Cap. of Operation (By Vol.) | 133% | | 133% | | 137% | | 133% | | 133.7% | |

[1] Settleable Solids. [2] Suspended Solids. [3] Dissolved Oxygen.

As will be seen from this table, the settleable solids in the primary unit, i.e. Unit No. 1 increased in orderly fashion day by day for about five consecutive days. On about the sixth day the primary unit began to unload and this is demonstrated by the increase in settleable solids in the secondary unit, Unit No. 2 which increased rapidly after the sixth day. It should be noted that even with the overflow of settleable solids from the primary unit, the secondary unit was able to handle the load easily. Furthermore, it should be noted that in Unit No. 1 in spite of the increase in settleable solids and the larger constant amount of suspended sludge, the sludge index as well as the sludge age remained fairly constant.

above described without withdrawing sludge from the aerator until the unit has achieved its maximum concentration permits the withdrawal of sludge at a much lower rate. Thus, instead of discharging sludge every day as is now the custom, my process and apparatus will permit the discharge of sludge at much more infrequent intervals of time. This is of major importance since it allows for the elimination of the digester, which is the most expensive part of the apparatus in any activated sludge process and in place thereof may be substituted a separate aeration unit which will serve to aerate the waste sludge. The sludge remaining after aeration in the aerator may be sent to conventional drying beds. The effluent liquid may be discharged directly to stream.

Having thus provided a written description of the present invention and provided specific examples thereof, it should be understood that no undue restrictions or limitations are to be imposed by reason thereof but that the present invention is defined by the appended claims.

I claim:

1. The process which comprises passing raw liquid sewage containing substantially all of the solid organic material normally associated therewith to a mixing zone, passing recycled activated sludge to the mixing zone, passing the said combined streams from the mixing zone to the upper part of an aeration zone containing activated sludge dispersed in a liquid stream, introducing air at a jet velocity of about 0.5 to 2 feet per second into the lower part of the aeration zone in an amount of about 500 to 750 cubic feet of air per pound of B.O.D. in the sewage and in a manner to promote turbulence for uniform dispersion of activated sludge throughout the aeration zone, the aeration zone having an $L/D$ ratio such that the aeration zone will retain the total sewage flow for about 1.25 hours, said aeration zone being surrounded by a clarifying zone, said aeration zone and clarifying zone superimposing a settling zone wherein activated sludge passing downwardly from the aeration zone settles to form a relatively dense mass thereof, the treated liquid sewage passes from the bottom of the aeration zone and flows upwardly through the clarifying zone wherein it is separated substantially from activated sludge, withdrawing the clarified liquid from the upper part of the clarifying zone, withdrawing dense mass of activated sludge from the settling zone at a rate of about 50 to 60 parts by volume per volume of raw sewage and recirculating substantially all of the same to the mixing zone as aforedescribed, and withdrawing dense mass of activated sludge from the settling zone.

2. The process of claim 1, wherein the amount of air introduced into said aeration zone is about 650 cubic feet per pound of B.O.D. in the raw sewage.

3. The process of claim 1 being further characterized by passing the clarified liquid to the upper part of a second aeration zone, passing recycled activated sludge to the upper part of the aeration zone, introducing air into the lower part of the second aeration zone in a quantity sufficient to effect substantial aerobic decomposition of organic constituents in the clarified liquid and to promote turbulence for uniform dispersion of the activated sludge throughout the second aeration zone, said second aeration zone being surrounded by a second clarifying zone, the second aeration zone and second clarifying zone superimposing a second settling zone wherein activated sludge passing downwardly from the second aeration zone settles to form a second relatively dense mass thereof, the second treated liquid passes from the bottom of the second aeration zone and flows upwardly through the second clarifying zone wherein it is separated substantially from the activated sludge, withdrawing a second clarified liquid from the upper part of the second clarifying zone, withdrawing continuously dense mass of activated sludge from the second settling zone and passing the same to the upper part of the second aeration zone, and withdrawing dense mass of activated sludge from the second settling zone at a rate equivalent to the net production of activated sludge in the second aeration zone and yielding the same from the system.

4. The process according to claim 3 wherein the amount of air introduced into said second aeration zone is about 500 cubic feet per pound of B.O.D. in the raw sewage.

5. The process of claim 3 being further characterized by passing the yield of dense activated sludge to a digestion zone wherein further separation of solids from liquid is effected, the separated solids are subjected to anaerobic decomposition in the digestion zone and the separated liquid is recycled to the upper part of the aeration zone.

6. The process of claim 3 being further characterized by a transfer zone interconnecting the first aeration zone with the second aeration zone and the flow of liquid containing activated sludge from the first to the second aeration zone being regulated to maintain a predetermined quantity of activated sludge in the latter.

7. The process of claim 3 being further characterized by passing activated sludge from the second settling zone to the first aeration zone.

8. The process according to claim 3 wherein the amount of air introduced into said aeration zone is about 400 to 600 cubic feet per pound of B.O.D. in the raw sewage.

9. A process which comprises passing raw liquid sewage containing substantially all of the solid organic material normally associated therewith to a mixing zone, passing the said combined streams from the mixing zone to the upper end of an aeration zone containing activated sludge dispersed in a liquid stream, introducing air at a jet velocity of about 0.5 to 2 feet per second into the lower part of the aeration zone from diffusers positioned about 12" above or below the bottom of said aeration zone in an amount of about 500 to 750 cubic feet of air per pound of B.O.D. in the sewage and in a manner to promote turbulence for uniform dispersion of activated sludge throughout the aeration zone, the aeration zone having an $L/D$ ratio such that the aeration zone will retain the total sewage flow for about 1.25 hours, said aeration zone being surrounded by a clarifying zone, said aeration zone and clarifying zone superimposing a settling zone wherein activated sludge passing downwardly from the aeration zone settles to form a relatively dense mass thereof, the treated liquid sewage passes from the bottom of the aeration zone and flows upwardly through the clarifying zone wherein it is separated substantially from activated sludge, withdrawing the clarified liquid from the upper part of the clarifying zone, withdrawing dense mass of activated sludge from the settling zone at a rate of about 50 to 60 parts by volume per volume of raw sewage such that the sludge age is maintained in the range of approximately 0.3 to 0.6 day recirculating substantially all of the sludge to the mixing zone as aforedescribed, and withdrawing dense mass of activated sludge from the settling zone.

10. A process which comprises passing raw liquid sewage containing substantially all of the solid organic material normally associated therewith in subdivided form to the upper part of an elongated aeration zone containing activated sludge dispersed in a liquid medium, passing recycled activated sludge to the upper part of the aeration zone, introducing an oxygen containing gas into the lower part of the aeration zone in a quantity sufficient to effect substantial aerobic decomposition of organic constituents in the aforesaid sewage and to promote turbulence for uniform dispersion of the activated sludge throughout the aeration zone, said aeration zone being surrounded by a clarifying zone, said aeration zone and clarifying zone superimposing a settling zone wherein activated sludge passing downwardly from the aeration zone settles to form a relatively dense mass thereof, the treated liquid sewage passes from the bottom of the aeration zone and flows upwardly through the clarifying zone wherein it is separated substantially from activated sludge, withdrawing clarified liquid from the upper part of the clarifying zone, withdrawing dense mass of total activated sludge from the settling zone, and continuously recirculating substantially all of the same to the upper part of the aeration zone as aforedescribed, passing said clarified liquid to a second aeration zone of a second stage comprising the second aeration zone, a second settling zone and a second clarifying zone and operating similarly as described above with the further feature of a transfer zone interconnecting the first aeration zone with the second aeration zone and the flow of liquid containing activated sludge from the first to the second aeration zone being regulated to maintain a predetermined quantity of activated sludge in the latter.

11. The process of claim 10 being further characterized by withdrawing a portion of the dense mass of activated sludge from the system and passing the dense activated sludge to a digestion zone wherein further separation of solids from liquid is effected, the separated solids being subjected to anaerobic decomposition in the digestion zone and the separated liquid being recycled to the upper part of the aeration zone.

12. A process which comprises passing raw liquid sewage containing substantially all of the solid organic material normally associated therewith to a mixing zone, passing the said combined streams from the mixing zone to the upper end of an aeration zone containing activated sludge dispersed in a liquid stream, introducing air at a jet velocity of about 0.5 to 2 feet per second into the lower part of the aeration zone from diffusers positioned about 12" above or below the bottom of said aeration zone in an amount of about 500 to 750 cubic feet of air per pound of B.O.D. in the sewage and in a manner to promote turbulence for uniform dispersion of activated sludge throughout the aeration zone, the aeration zone having an L/D ratio such that the aeration zone will retain the total sewage flow for about 1.25 hours, said aeration zone being surrounded by a clarifying zone, said aeration zone and clarifying zone superimposing a settling zone wherein activated sludge passing downwardly from the aeration zone settles to form a relatively dense mass thereof, the treated liquid sewage passes from the bottom of the aeration zone and flows upwardly through the clarifying zone wherein it is separated substantially from activated sludge, withdrawing the clarified liquid from the upper part of the clarifying zone, withdrawing dense mass of activated sludge from the settling zone, and repeatedly recirculating substantially all of the activated sludge to the upper part of the aeration zone as aforedescribed without discharging any sludge from the system for five days and then intermittently discharging sludge from the settling zone.

13. A sewage system comprising means for introducing raw liquid sewage containing substantially all of the solid organic material normally associated therewith in subdivided form to the upper part of an aeration chamber disposed concentrically in a tank, a clarifying zone being formed between the walls of said chamber and said tank, means for introducing an oxygen containing gas substantially in the bottom of said aeration chamber to effect substantial aerobic decomposition of organic constituents in the aforesaid sewage, means for withdrawing the treated sewage from the upper part of said clarifying zone, means for withdrawing dense mass of total activated sludge from the bottom of said tank and means for recirculating substantially all of said activated sludge to the upper part of said aeration chamber, means for passing said clarified sewage to a second stage constructed similarly to the first stage apparatus described above with the further feature of a transfer means interconnecting the aeration chamber of the first stage with the aeration chamber of said second stage such that the sewage containing activated sludge from said first aeration chamber is passed to said second aeration chamber and regulated to maintain a predetermined quantity of activated sludge in the latter.

14. The system of claim 13 being further characterized by withdrawing a portion of said dense mass of activated sludge from the system and passing said dense mass of activated sludge to an aerating unit wherein said sludge is subjected to further aeration.

References Cited by the Examiner

UNITED STATES PATENTS

| | | | |
|---|---|---|---|
| 2,404,223 | 7/46 | Durdin | 210—6 |
| 2,492,486 | 12/49 | Kivari et al. | 210—5 |
| 2,568,452 | 9/51 | Kelly et al. | 210—46 |
| 2,678,915 | 5/54 | Kalinske | 210—7 |
| 2,679,477 | 5/54 | Kivari | 210—221 X |
| 2,825,691 | 3/58 | Fischer | 210—197 X |

OTHER REFERENCES

"New Equipment for the Activated Sludge Process," Kalinske et al., Water & Sewage Works, July 1956, vol. 103, pp. 324–329.

Total Oxidation Treatment of Organic Wastes, Tapleshay, Sewage and Industrial Wastes, May 1958, vol. 30, No. 5, pages 652–661.

MORRIS O. WOLK, *Primary Examiner.*

CARL F. KRAFFT, ALEXANDER WYMAN, WILLIAM B. KNIGHT, *Examiners.*